United States Patent
Jiang et al.

(10) Patent No.: US 11,187,719 B2
(45) Date of Patent: Nov. 30, 2021

(54) IN-MOTION INITIALIZATION OF ACCELEROMETER FOR ACCURATE VEHICLE POSITIONING

(71) Applicant: QUALCOMM Incorporated, San Diego, CA (US)

(72) Inventors: Libin Jiang, Seattle, WA (US); Urs Niesen, Berkeley Heights, NJ (US); Jubin Jose, Belle Mead, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 283 days.

(21) Appl. No.: 16/242,135

(22) Filed: Jan. 8, 2019

(65) Prior Publication Data

US 2020/0217873 A1 Jul. 9, 2020

(51) Int. Cl.
*G01P 21/00* (2006.01)
*B60K 35/00* (2006.01)
(Continued)

(52) U.S. Cl.
CPC .............. *G01P 21/00* (2013.01); *B60K 35/00* (2013.01); *G01P 15/08* (2013.01); *G01P 15/14* (2013.01); *B60K 2370/12* (2019.05)

(58) Field of Classification Search
CPC .......... G01P 21/00; G01P 15/08; G01P 15/14; B60K 35/00
See application file for complete search history.

(56) References Cited

U.S. PATENT DOCUMENTS 6,170,344 B1    1/2001   Ignagni
6,308,134 B1 * 10/2001   Croyle ................... G01C 21/16
                                                                  340/990

(Continued)

FOREIGN PATENT DOCUMENTS

CN      108426584 A     8/2018
EP       2503288 A2     9/2012
(Continued)

OTHER PUBLICATIONS

H. Liu, S. Luo and J. Lu, "Method for Adaptive Robust Four-Wheel Localization and Application in Automatic Parking Systems," in IEEE Sensors Journal, vol. 19, No. 22, pp. 10644-10653, 15 Nov. 15, 2019, doi: 10.1109/JSEN.2019.2932411 (Year: 2019).*

(Continued)

*Primary Examiner* — Catherine T. Rastovski
*Assistant Examiner* — Aeysha N Sultana
(74) *Attorney, Agent, or Firm* — Thien T. Nguyen

(57) ABSTRACT

Techniques provided herein are directed toward addressing these and other issues by providing robust means for initializing an accelerometer that can take place even while a vehicle is in motion. Specifically, linear acceleration and velocity data can be estimated from wheel speeds, and angular velocity can be estimated with a gyroscope. The vehicle's acceleration can then be computed from these estimates, and subtracted from a total acceleration measured by the accelerometer to determine gravitational acceleration, which can then be accounted for in subsequent measurements taken by the accelerometer. A vehicle velocity may also be determined based on the vehicle's estimated angular velocity and linear velocity. Embodiments may also employ techniques for translating measurements taken in one coordinate frame to another coordinate frame for estimate determination and/or outlier compensation.

43 Claims, 9 Drawing Sheets

(51) Int. Cl.
    *G01P 15/08*           (2006.01)
    *G01P 15/14*           (2013.01)

(56)             References Cited

U.S. PATENT DOCUMENTS

| | | | | |
|---|---|---|---|---|
| 8,589,015 | B2 * | 11/2013 | Willis | G01C 21/165 |
| | | | | 701/29.1 |
| 2004/0167692 | A1 * | 8/2004 | Lu | B60T 8/172 |
| | | | | 701/38 |
| 2004/0199300 | A1 * | 10/2004 | Gustafsson | B60T 8/1706 |
| | | | | 701/1 |
| 2005/0038589 | A1 * | 2/2005 | Shukla | B60T 8/172 |
| | | | | 701/80 |
| 2018/0188032 | A1 * | 7/2018 | Ramanandan | G01S 19/53 |
| 2018/0312170 | A1 * | 11/2018 | Bando | B60W 40/10 |
| 2019/0322255 | A1 * | 10/2019 | Krucinski | B60T 8/1725 |
| 2020/0318971 | A1 * | 10/2020 | Mori | B60W 30/04 |

FOREIGN PATENT DOCUMENTS

| | | | | |
|---|---|---|---|---|
| EP | 3336488 | A1 * | 6/2018 | G01C 21/165 |
| EP | 3336488 | A1 | 6/2018 | |
| WO | 2018128668 | A1 | 7/2018 | |

OTHER PUBLICATIONS

International Search Report and Written Opinion—PCT/US2019/068020—ISA/EPO—dated May 25, 2020.

\* cited by examiner

IN-MOTION INITIALIZATION OF ACCELEROMETER FOR ACCURATE VEHICLE POSITIONING

BACKGROUND

Vehicle systems, such as autonomous driving and advanced driver-assist systems (ADAS), often need highly-accurate positioning information to operate correctly. Global Navigation Satellite Systems (GNSS), such as Global positioning system (GPS) and/or similar satellite-based positioning technologies can provide such positioning data in open sky scenarios. However, the performance of GNSS drastically degrades if large parts of the sky are obstructed. This occurs, for example, in so-called "urban canyon" scenarios, where GNSS-based estimated positions may be off by as much as 50 m. These large positioning errors can be prohibitive in vehicular automation and/or navigation.

To address these and other issues, position determination may further be based on data from non-GNSS sources, such a camera, inertial sensor (e.g., gyroscope and/or accelerometer), and/or other sensor indicative of vehicle motion. Visual-inertial odometry (VIO), for instance, combines camera and inertial sensor data to provide vehicle position information that may be used as a complement and/or substitute of GNSS-determined vehicle position. Problematically, initialization (initial calibration) of the accelerometer must traditionally be done when the vehicle is not in motion, to ensure direct and accurate measurement of gravity by the accelerometer. This restriction to initialization while being stationary, however, can be quite limiting in practical circumstances.

BRIEF SUMMARY

Techniques provided herein are directed toward addressing these and other issues by providing robust means for initializing an accelerometer that can take place even while a vehicle is in motion. Specifically, linear acceleration and velocity data can be estimated from wheel speeds, and angular velocity can be estimated with a gyroscope. The vehicle's acceleration can then be computed from these estimates, and subtracted from a total acceleration (often termed the "specific force") measured by the accelerometer to determine gravitational acceleration, which can then be accounted for in subsequent measurements taken by the accelerometer. A vehicle velocity may also be determined based on the vehicle's estimated angular velocity and linear velocity. Embodiments may also employ techniques for translating measurements taken in one coordinate frame to another coordinate frame for estimate determination and/or outlier compensation.

An example method of initializing an accelerometer located on a vehicle, according to the description, comprises estimating a total acceleration based on measurements from the accelerometer taken during a period of time, estimating a linear velocity and an acceleration based on wheel rotation measurements of the vehicle taken during the period of time, estimating an angular velocity based on measurements from a gyroscope located on the vehicle and taken during the period of time, determining vehicle acceleration based on the estimated linear velocity, estimated total acceleration, and estimated angular velocity, determining gravitational acceleration based on the estimated total acceleration and determined vehicle acceleration, and offsetting, with a processing unit located on the vehicle, a subsequent measurement of the accelerometer based on the determined gravitational acceleration.

Alternative embodiments of the method may comprise one or more of the following features. The method may further comprise determining a vehicle velocity using the estimated angular velocity and estimated linear velocity, and using the determined vehicle velocity to initialize a navigation filter. Estimating the linear velocity and estimating the total acceleration may further comprise translating the wheel rotation measurements from a first coordinate frame to a second coordinate frame. The accelerometer and the gyroscope may compose at least a portion of an inertial measurement unit (IMU) located on the vehicle. The IMU may compose a portion of a visual inertial odometry (VIO) system located on the vehicle. The method may further comprise estimating, with the processing unit, a location of the vehicle based at least in part on the offset subsequent measurement of the accelerometer. The method may further comprise performing outlier compensation on the wheel rotation measurements, measurements from the gyroscope, or measurements from the accelerometer, or any combination thereof. The method may further comprise performing outlier compensation on the wheel rotation measurements, wherein performing the outlier compensation comprises determining values of staggered differences of the wheel rotation measurements. Determining the vehicle acceleration may comprise taking a median of the determined values of staggered differences. The method may further comprise determining a vehicle velocity at least in part by using the estimated angular velocity and estimated linear velocity and determining a constant for each wheel rotation measurement, based at least in part on the determined vehicle acceleration. Determining the vehicle velocity further may be based on a median of the constants for the wheel rotation measurements.

An example mobile computing system, according to the description, comprises a memory and a processing unit. The processing unit is communicatively coupled with the memory and configured to estimate a total acceleration based on measurements received from an accelerometer located on a vehicle and taken during a period of time, estimate a linear velocity and an acceleration based on wheel rotation measurements of the vehicle taken during the period of time, estimate an angular velocity based on measurements from a gyroscope located on the vehicle and taken during the period of time, determine vehicle acceleration based on the estimated linear velocity, estimated total acceleration, and estimated angular velocity, determine gravitational acceleration based on the estimated total acceleration and determined vehicle acceleration, and offset a subsequent measurement of the accelerometer based on the determined gravitational acceleration.

Alternative embodiments of the mobile computing system may include one or more the following features. The processing unit may be further configured to determine a vehicle velocity using the estimated angular velocity and estimated linear velocity, and use the determined vehicle velocity to initialize a navigation filter. The processing unit may be configured to estimate the linear velocity and configured to estimate the total acceleration at least in part by translating the wheel rotation measurements from a first coordinate frame to a second coordinate frame. The mobile computing system may further comprise an IMU comprising the accelerometer and the gyroscope. The mobile computing system may further comprise a visual inertial odometry (VIO) system, which comprises the IMU. The processing unit may be configured to estimate a location of the vehicle based at least in part on the offset subsequent measurement of the accelerometer. The processing unit may be configured to perform outlier compensation on the wheel rotation measurements, measurements from the gyroscope, or measurements from the accelerometer, or any combination thereof. The processing unit may be configured to perform the outlier compensation at least in part by determining values of staggered differences of the wheel rotation measurements. The processing unit may be configured to determine the vehicle acceleration at least in part by taking a median of the determined values of staggered differences. The processing unit may be configured to determine a vehicle velocity at least in part by using the estimated angular velocity and estimated linear velocity and determining a constant for each wheel rotation measurement, based at least in part on the determined vehicle acceleration. The processing unit may be configured to determine the vehicle velocity further based on a median of the constants for the wheel rotation measurements.

An example device, according to the description, comprises means for estimating a total acceleration based on acceleration measurements of a vehicle taken during a period of time, means for estimating a linear velocity and an acceleration based on wheel rotation measurements of the vehicle taken during the period of time, means for estimating an angular velocity based on measurements of rotational movement of the vehicle taken during the period of time, means for determining vehicle acceleration based on the estimated linear velocity, estimated total acceleration, and estimated angular velocity, means for determining gravitational acceleration based on the estimated total acceleration and determined vehicle acceleration, and means for offsetting a subsequent acceleration measurement based on the determined gravitational acceleration.

Alternative embodiments of the device may further comprise one or more of the following features. The device may comprise means for determining a vehicle velocity using the estimated angular velocity and estimated linear velocity, and means for using the determined vehicle velocity to initialize a navigation filter. The means for estimating the linear velocity and the means for estimating the total acceleration may further comprise means for translating the wheel rotation measurements from a first coordinate frame to a second coordinate frame. The device may further comprise means for obtaining the acceleration measurements of the vehicle and measurements of rotational movement of the vehicle from an inertial measurement unit (IMU) located on the vehicle. The IMU may compose a portion of a visual inertial odometry (VIO) means located on the vehicle. The device may further comprise means for estimating a location of the vehicle based at least in part on the offset subsequent acceleration measurement. The device may further comprise means for performing outlier compensation on the wheel rotation measurements, measurements of rotational movement of the vehicle, or acceleration measurements of the vehicle, or any combination thereof. The means for performing outlier compensation on the wheel rotation measurements may include means for determining values of staggered differences of the wheel rotation measurements. The means for determining the vehicle acceleration may comprise means for taking a median of the determined values of staggered differences. The device may further comprise means for determining a vehicle velocity at least in part by using the estimated angular velocity and estimated linear velocity and means for determining a constant for each wheel rotation measurement, based at least in part on the determined vehicle acceleration. The means for determining the vehicle velocity further is configured to base the determining on a median of the constants for the wheel rotation measurements.

An example non-transitory computer-readable medium, according to the description, has instructions embedded thereon for initializing an accelerometer located on a vehicle. The instructions when executed by one or more processing units, cause the one or more processing units to estimate a total acceleration based on measurements from the accelerometer taken during a period of time, estimate a linear velocity and an acceleration based on wheel rotation measurements of the vehicle taken during the period of time, estimate an angular velocity based on measurements from a gyroscope located on the vehicle and taken during the period of time, determine vehicle acceleration based on the estimated linear velocity, estimated total acceleration, and estimated angular velocity, determine gravitational acceleration based on the estimated total acceleration and determined vehicle acceleration, and offset a subsequent measurement of the accelerometer based on the determined gravitational acceleration.

Alternative embodiments of the non-transitory computer-readable medium may comprise one or more of the following features. The non-transitory computer-readable medium may further comprise instructions that, when executed by the one or more processing units, further cause the one or more processing units to determine a vehicle velocity using the estimated angular velocity and estimated linear velocity, and use the determined vehicle velocity to initialize a navigation filter. The instructions for estimating the linear velocity and the instructions for estimating the total acceleration may further comprise instructions that, when executed by the one or more processing units, further cause the one or more processing units to translate the wheel rotation measurements from a first coordinate frame to a second coordinate frame. The non-transitory computer-readable medium may further comprise instructions that, when executed by the one or more processing units, further cause the one or more processing units to obtain the measurements from the accelerometer and the measurements from the gyroscope from an inertial measurement unit (IMU) located on the vehicle. The non-transitory computer-readable medium may further comprise instructions that, when executed by the one or more processing units, further cause the one or more processing units to estimate, a location of the vehicle based at least in part on the offset subsequent measurement of the accelerometer. The non-transitory computer-readable medium may further comprise instructions that, when executed by the one or more processing units, further cause the one or more processing units to perform outlier compensation on the wheel rotation measurements, measurements from the gyroscope, or measurements from the accelerometer, or any combination thereof. The instructions for performing outlier compensation on the wheel rotation measurements may comprise instructions for determining values of staggered differences of the wheel rotation measurements. The instructions for determining the vehicle acceleration may comprise instructions for taking a median of the determined values of staggered differences. The non-transitory computer-readable medium may further comprise instructions that, when executed by the one or more processing units, further cause the one or more processing units to determine a vehicle velocity at least in part by using the estimated angular velocity and estimated linear velocity and determine a constant for each wheel rotation measurement, based at least in part on the determined vehicle acceleration. The instructions for determining the vehicle velocity further include instructions for basing the determining on a median of the constants for the wheel rotation measurements.

BRIEF DESCRIPTION OF THE DRAWINGS

Aspects of the disclosure are illustrated by way of example.

Like reference symbols in the various drawings indicate like elements, in accordance with certain example implementations. In addition, multiple instances of an element may be indicated by following a first number for the element with a letter or a hyphen and a second number. For example, multiple instances of an element 110 may be indicated as 110-1, 110-2, 110-3 etc. or as 110a, 110b, 110c, etc. When referring to such an element using only the first number, any instance of the element is to be understood (e.g., element 110 in the previous example would refer to elements 110-1, 110-2, and 110-3 or to elements 110a, 110b, and 110c).

DETAILED DESCRIPTION

Several illustrative embodiments will now be described with respect to the accompanying drawings, which form a part hereof. The ensuing description provides embodiment(s) only, and is not intended to limit the scope, applicability or configuration of the disclosure. Rather, the ensuing description of the embodiment(s) will provide those skilled in the art with an enabling description for implementing an embodiment. It is understood that various changes may be made in the function and arrangement of elements without departing from the spirit and scope of this disclosure.

It can be noted that, although embodiments described herein below are directed toward determining the position of a vehicle, embodiments are not so limited. Alternative embodiments, for example, may be directed toward other mobile devices and/or applications in which alternative types of motion data indicative of acceleration and/or velocity (e.g., other than wheel speed measurements, as described herein) may be utilized. A person of ordinary skill in the art will recognize many variations to the embodiments described herein.

Current navigation technology often utilizes GNSS-based position determination of a vehicle (or a separate mobile device within the vehicle) to determine a route from the vehicle's current position to a desired destination. GNSS-based positioning is often accurate enough to provide satisfactory navigation for such applications. However, for more advanced functionality, such as ADAS, semi-autonomous driving, fully-autonomous driving, and the like, highly accurate position determination is imperative to ensure proper functionality. GNSS-based positioning alone can often fall short of providing sufficiently accurate position determination for such functionality, especially in "urban canyons" or similar scenarios in which a GNSS receiver of the vehicle may receive insufficient signals (not enough signals, signals with insufficient signal strength, signals from non-line-of-sight (NLoS) satellites, etc.) from the GNSS system for accurate position determination.

Figure 1:
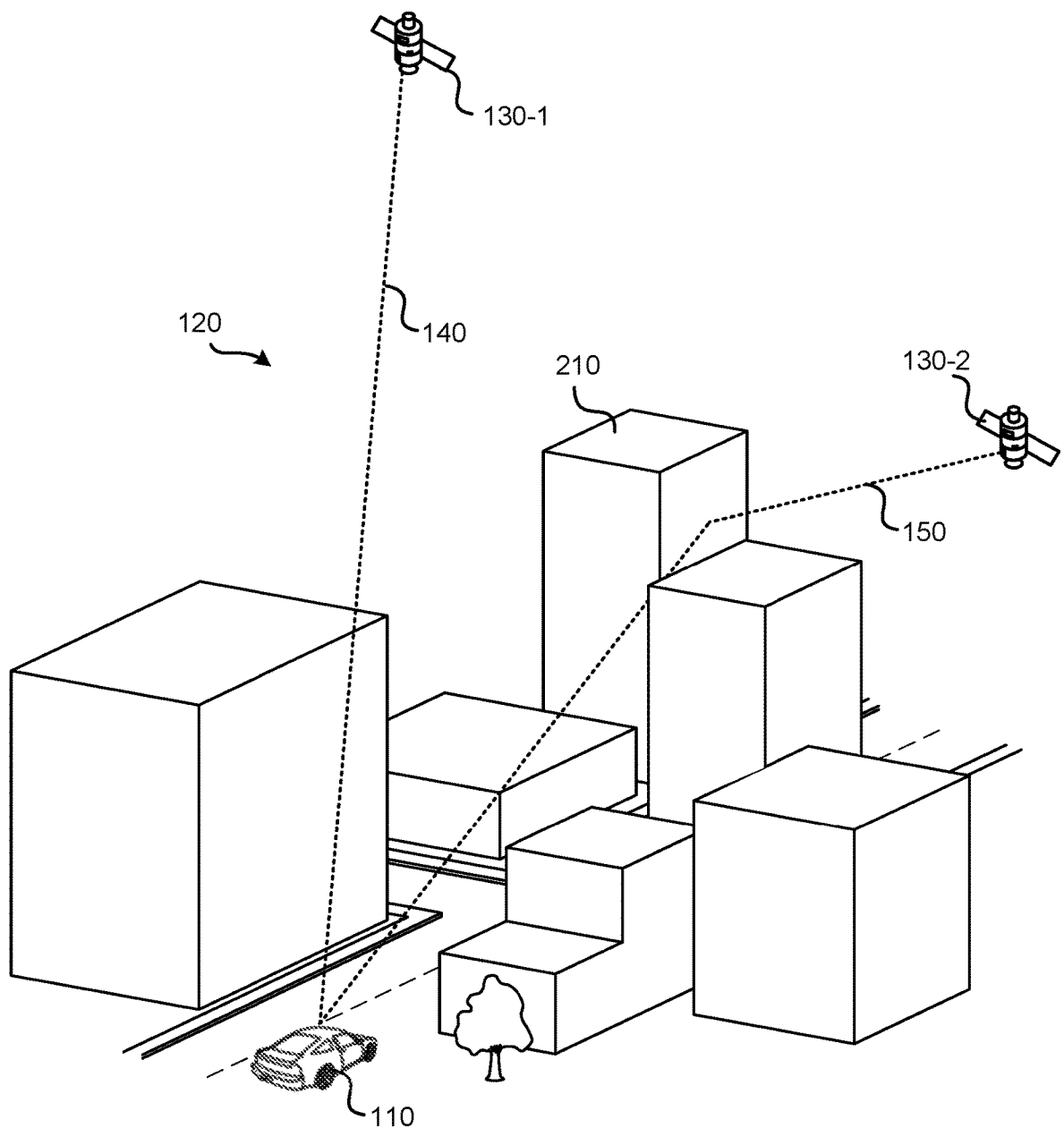
FIG. 1 is a simplified drawing providing an illustration of a scenario in which accurate position determination may not be made on GNSS data alone.

FIG. 1 is a simplified drawing providing an illustration of a scenario in which accurate position determination may not be made on GNSS data alone. Here, a vehicle 110 is driving in an urban environment 120 with multiple tall buildings. Satellites 130-1 and 130-2 (collectively referred to herein as "satellites 130") may comprise satellite vehicles of a GNSS system that provide wireless (e.g., radio frequency (RF)) signals 140, 150 to a GNSS receiver on the vehicle 110 for determination of the position (e.g., absolute or global coordinates) of the vehicle 110. (Of course, although satellites 130 in FIG. 1 are illustrated as relatively close to the urban environment 120 for visual simplicity, it will be understood that satellites 130 will be in orbit around the earth. Moreover the satellites 130 may be part of a large constellation of satellites of a GNSS system. Additional satellites of such a constellation are not shown in FIG. 1.)

Because the urban environment 120 has multiple tall buildings, it can create what is called an "urban canyon" that can make GNSS-based positioning of the vehicle 110 difficult in at least two ways. First, the buildings can block large portions of the sky, from the perspective of the vehicle 110, so that the GNSS receiver of the vehicle 110 is unable to receive signals from GNSS satellites in the blocked portions of the sky. Second, because satellite signals can reflect off of buildings, the GNSS receiver of the vehicle 110 may receive indirect signals 150 that can result in an inaccurate position determination. This phenomenon is illustrated in the scenario depicted in FIG. 1.

Thus, in "urban canyons" (as illustrated in FIG. 1) or similar scenarios, position determination from GNSS measurements alone may not be accurate. A position determination function (e.g., executed in hardware and/or software of a computer system of the vehicle 110) may need to rely on data from other sensors of the vehicle 110 to help improve accuracy. Techniques described herein below are directed toward ways in which one such sensor, an accelerometer, may be initialized to help provide accurate measurements for such position determination.

The above description notwithstanding, it can be noted that techniques provided herein may be used in a variety of applications and embodiments. As previously noted, techniques may be used in situations (as depicted in FIG. 1) where GNSS data may be incomplete or inaccurate. Additionally or alternatively, techniques provided herein may be utilized in embodiments in which position determination is wholly dependent on non-GNSS a data. That is, the techniques described herein below may be used to help ensure accuracy of accelerometer data in any of a variety of embodiments, regardless of whether GNSS measurement data is available.

Figure 2:
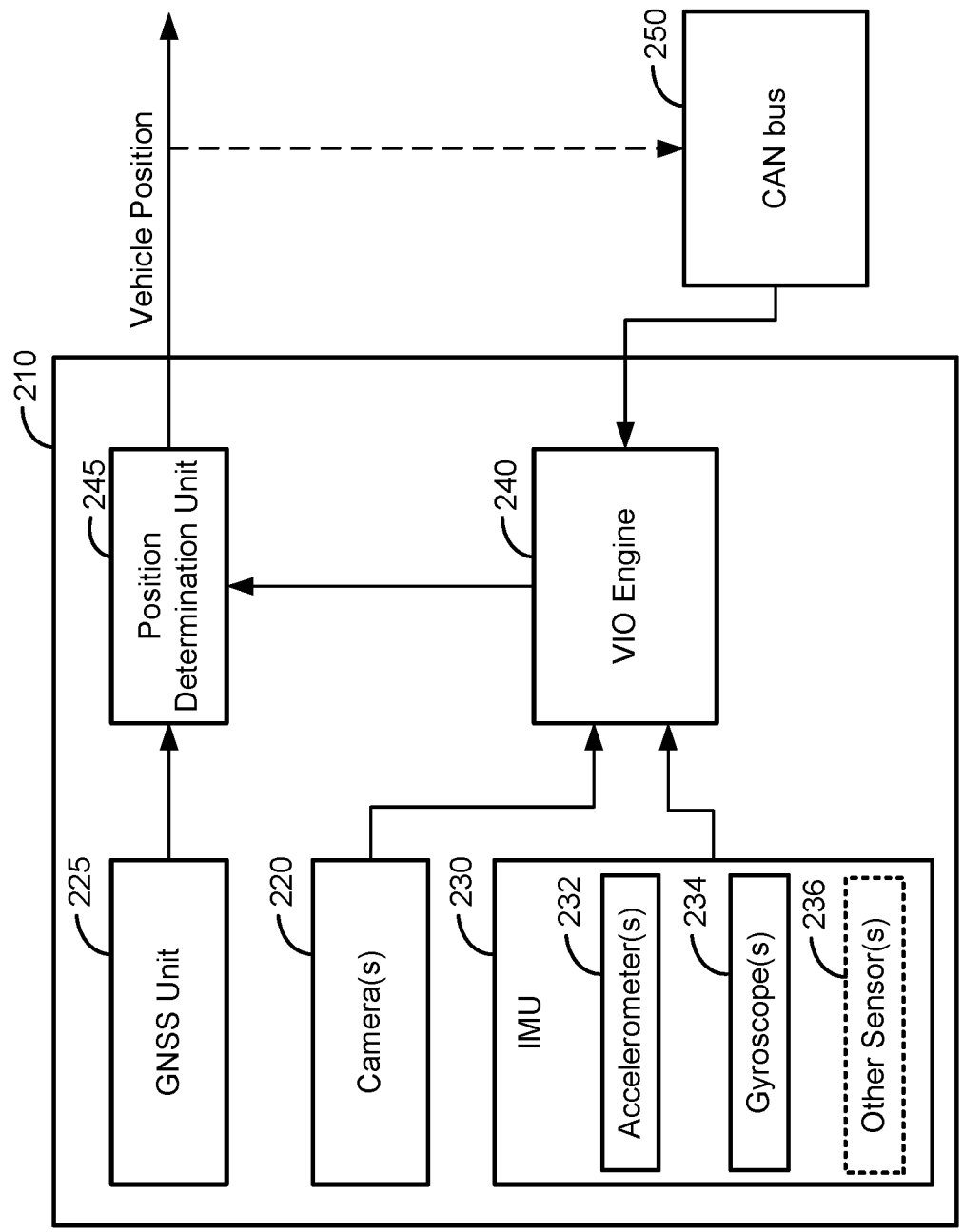
FIG. 2 is a block diagram of an on-vehicle position system, according to an embodiment.

FIG. 2 is a block diagram of an on-vehicle position system 210, according to an embodiment, which may be used to employ some or all of the techniques for accelerometer initialization described herein below. The on-vehicle position system 210 collects data from various different sources to determine and output a vehicle location and/or other position information. The vehicle position can then be used in various applications and may be provided to other systems on the vehicle and/or systems remote to the vehicle.

A person of ordinary skill in the art will understand that, in alternative embodiments, the components illustrated in FIG. 2 may be combined, separated, omitted, alternatively connected, and/or otherwise altered, depending on desired functionality. Moreover, one or more components of the on-vehicle position system 210 may be implemented in hardware, firmware, and/or software, such as the hardware, firmware, and/or software components of the mobile computing system 800 illustrated in FIG. 8 and described in more detail below. These various hardware, firmware, and/or software components may be distributed at various different locations on a vehicle, depending on desired functionality As previously mentioned, the on-vehicle position system 210 can collect data from various sources to determine a position of the vehicle. Primary sources of data include the GNSS unit 225, camera(s) 220, and inertial measurement unit (IMU) 230. In alternative embodiments, the on-vehicle position system 210 may collect data from other sources additionally or alternatively.

The GNSS unit 225 may comprise a GNSS receiver and GNSS processing circuitry configured to receive signals from GNSS satellites and GNSS-based positioning data. The positioning data output by the GNSS unit 225 can vary, depending on desired functionality. In some embodiments, the GNSS unit 225 will provide, among other things, a three-degrees-of-freedom (3DoF) position determination (e.g., latitude, longitude, and altitude). Additionally or alternatively, the GNSS unit 225 can output the underlying satellite measurements used to make the 3DoF position determination. Additionally, or alternatively, the GNSS unit can output raw measurements, such as pseudo-range and carrier-phase measurements.

The camera(s) 220 may comprise one or more cameras disposed on or in the vehicle, configured to capture images, from the perspective of the vehicle, to help track movement of the vehicle. The camera(s) 220 may be front-facing, upward-facing, backward-facing, downward-facing, and/or otherwise positioned on the vehicle. Other aspects of the camera(s) 220, such as resolution, frame rate, optical band (e.g., visible light, infrared (IR), etc.), etc. may be determined based on desired functionality. Movement of the vehicle may be tracked from images captured by the camera (s) 220 using various image processing techniques to determine motion blur, object tracking, and the like. The raw images and/or information resulting therefrom may be passed to a VIO engine, which can use the information, along with information received from the IMU 230 for position determination.

IMU 230 comprises one or more accelerometers 232, gyroscopes 234, and (optionally) other sensors 236, such as magnetometers, to provide inertial measurements. Similar to the camera(s) 220, the output of the IMU 230 to the VIO engine 240 may vary, depending on desired functionality. In some embodiments, the output of the IMU 230 may comprise information indicative of a three degrees-of-freedom (DoF) position or a 6DoF pose of the vehicle, and/or a 6DoF linear and angular velocities of the vehicle, and may be provided periodically, based on a schedule, and/or in response to a triggering event. The position information may be relative to an initial or reference position. Alternatively, the IMU may provide raw sensor measurements.

The VIO engine 240 may comprise a module (implemented in software and/or hardware) configured to combine input from the camera(s) 220 and IMU 230 into a single output. For example, the different inputs may be given different weights based on input type, a confidence metric (or other indication of the reliability of the input), and the like. The output of the VIO engine 240 may comprise a 3DoF position and/or 6DoF pose based on received inputs. This estimated position may be relative to an initial or reference position, and may be synchronized to the output of the GNSS unit 225.

To provide the estimated position, the VIO engine 240 uses a navigation filter to track estimates of several quantities (referred to as states). Usually these include vehicle pose and (linear) velocity. The navigation filter may need to be initialized to ensure position determination accuracy. Initializing the navigation filter may involve initializing the states of the navigation filter with coarse initial guesses for these quantities. When initializing the navigation filter while the vehicle is static, this may be trivial for the velocity state, since it can simply be set to zero. However, when initializing the navigation filter while the vehicle is in motion, the initial value for the velocity state may need to be more carefully chosen.

Similar to the VIO engine 240, the position determination unit 245 may combine information received from multiple sources. Here, the position determination unit 245 receives information from the GNSS unit 225 and the VIO engine 240. It should be recognized that the position determination unit 245 may receive information from other sources as well, such as from a cellular base station, a wireless access point, or the like. With this information, the position determination unit 245 can output a determined position (e.g., a 3DoF position or 6DoF pose) of the vehicle 110, relying on the output of VIO engine 240 to replace, complement, and/or enhance position determination of the GNSS unit 225, depending on desired functionality. In some embodiments, the VIO engine 240 and position determination unit 245 may be combined (i.e., executed by the same software and/or hardware components of an on-vehicle position system 210).

The output vehicle position may serve any of a variety of functions, depending on desired functionality. For example, it may be provided as an output of the on-vehicle position system 210 to other systems on the vehicle (and may be conveyed via a controller area network (CAN) bus, which is described in additional detail below), communicated to devices separate from the vehicle 110 (including other vehicles; servers maintained by government agencies, service providers, and the like; etc.), shown on a display of the vehicle (e.g., to a driver or other user for navigation or other purposes), and the like.

Because the vehicle position determined by the position determination unit 245 may be impacted by the output of the VIO engine 240, which, in turn is reliant on the accelerometer(s) 232 of the IMU 230, the accuracy of the data provided by the accelerometer(s) 232 is important in the determination of the vehicle position. And, as previously noted, proper accelerometer initialization, which accounts for acceleration measurements due to gravity, is important to ensure such accuracy. Traditional techniques involve conducting accelerometer initialization while the vehicle 110 is stationary. However, according to embodiments described herein, vehicle velocity and acceleration information may be used to allow for accelerometer and navigation filter initialization while the vehicle is in motion. According to some embodiments, the VIO engine 240 can obtain vehicle velocity and acceleration information from a CAN bus 250 and perform the accelerometer initialization as described below. That said, a person of ordinary skill in the art will appreciate that techniques may be employed by any of a variety of types of hardware and/or software architectures.

Figure 3:
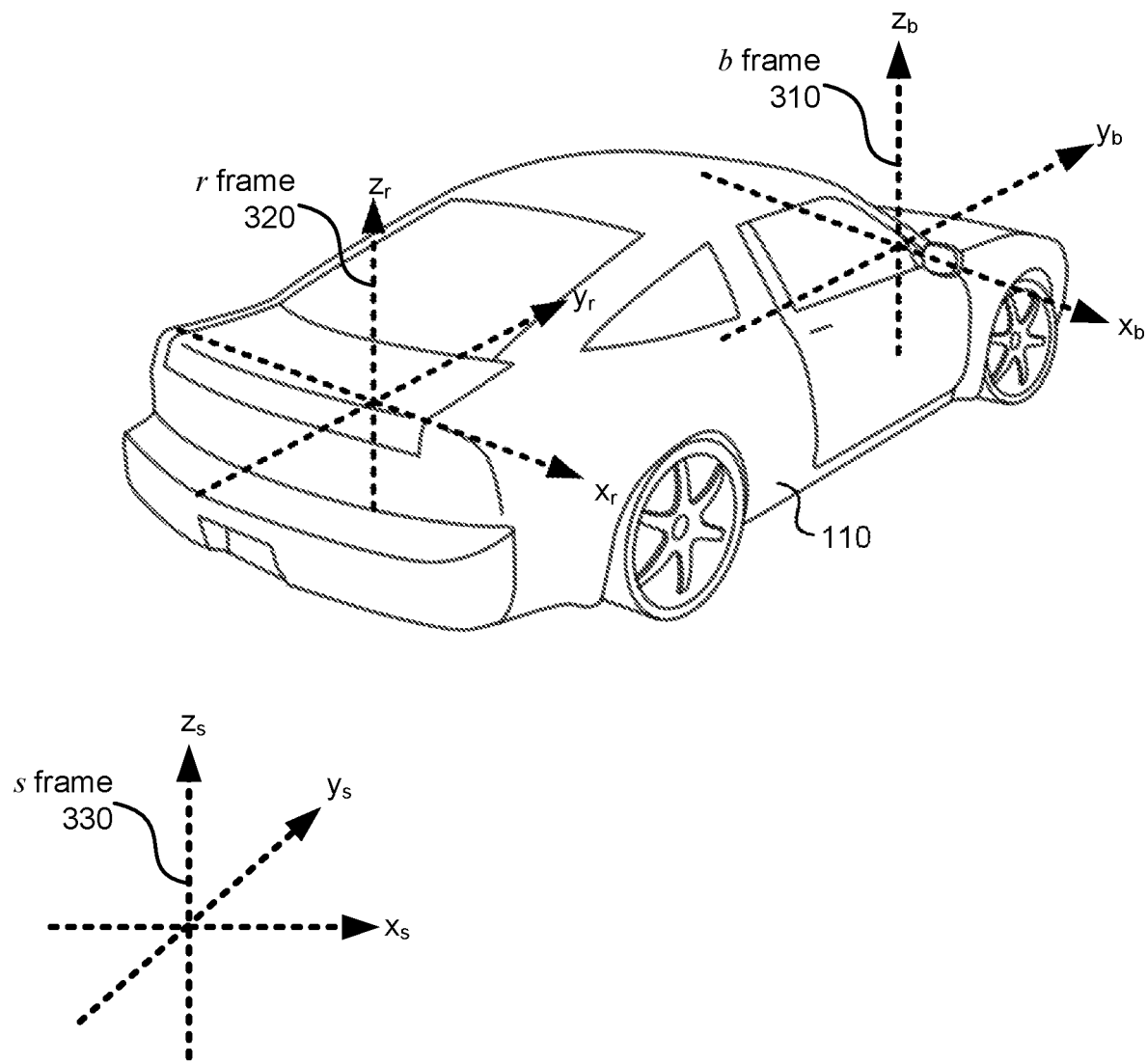
FIG. 3 is an illustration of various coordinate frames with respect to a vehicle, which may be utilized in performing the techniques for accelerometer initialization described herein.

FIG. 3 is an illustration of various coordinate frames with respect to a vehicle 110, which may be utilized in performing the techniques for accelerometer initialization described herein. In particular, the b frame 310 comprises a coordinate frame of an accelerometer body (e.g., the body of an accelerometer 232 as illustrated in FIG. 2); the r frame 320 comprises a coordinate frame of the vehicle body, located at the rear axle of the vehicle; and the s frame 330 comprises a spatial coordinate frame which represents a coordinate frame outside the vehicle 110, which may be independent of the vehicle 110 (e.g., a coordinate system relative to the earth) and which may be the coordinate system used by the GNSS unit 225. Because both of the b frame 310 and the r frame 320 are fixed, relative to the vehicle 110, the translation and rotation between the b frame 310 and the r frame 320 (although it may be vehicle-dependent) is constant and may therefore be known for any particular vehicle and/or vehicle type. Thus, variables defined in one coordinate frame may be translated to the other.

Figure 4:
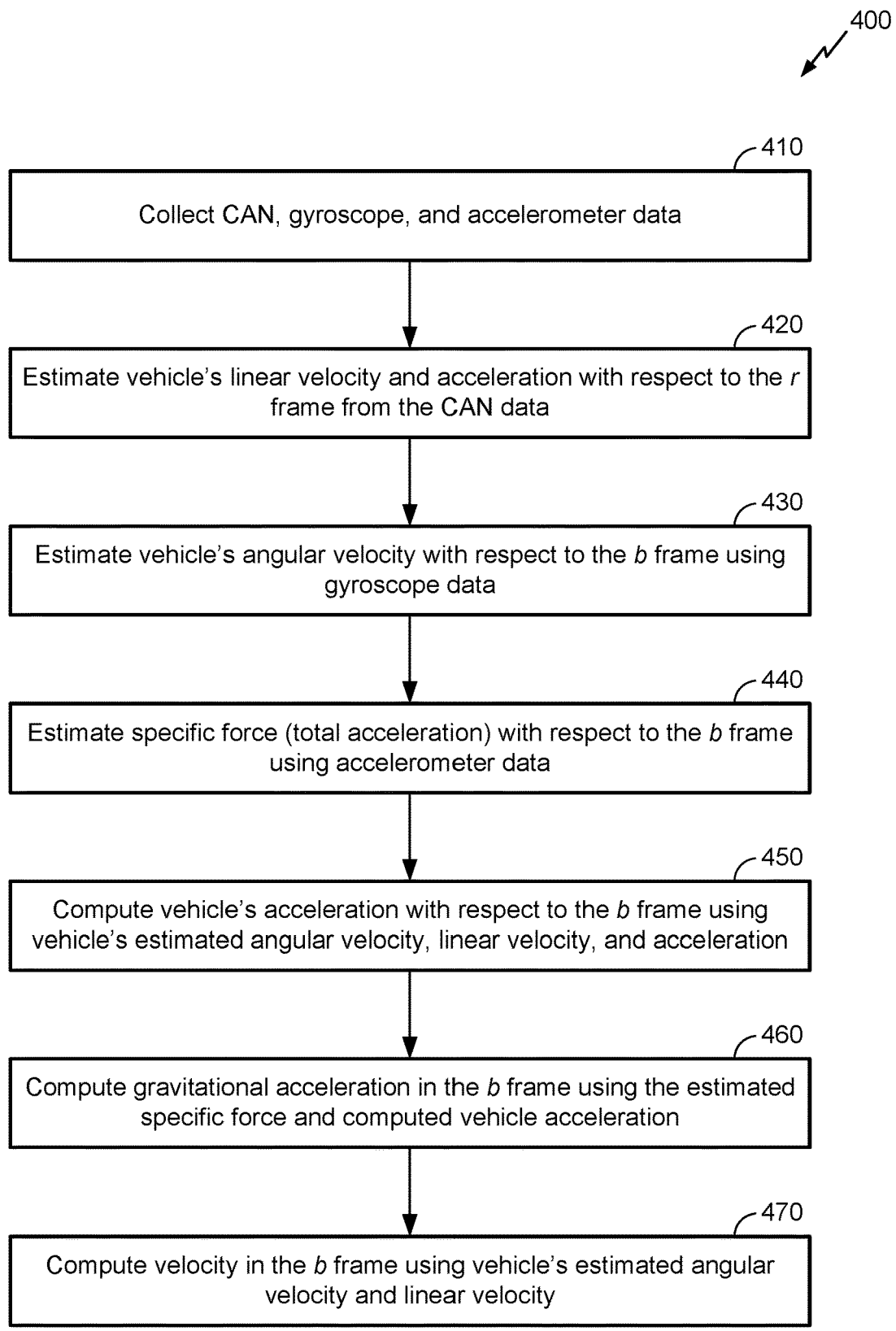
FIG. 4 is a flow diagram illustrating a method of robust accelerometer initialization, according to an embodiment.
Figure 8:
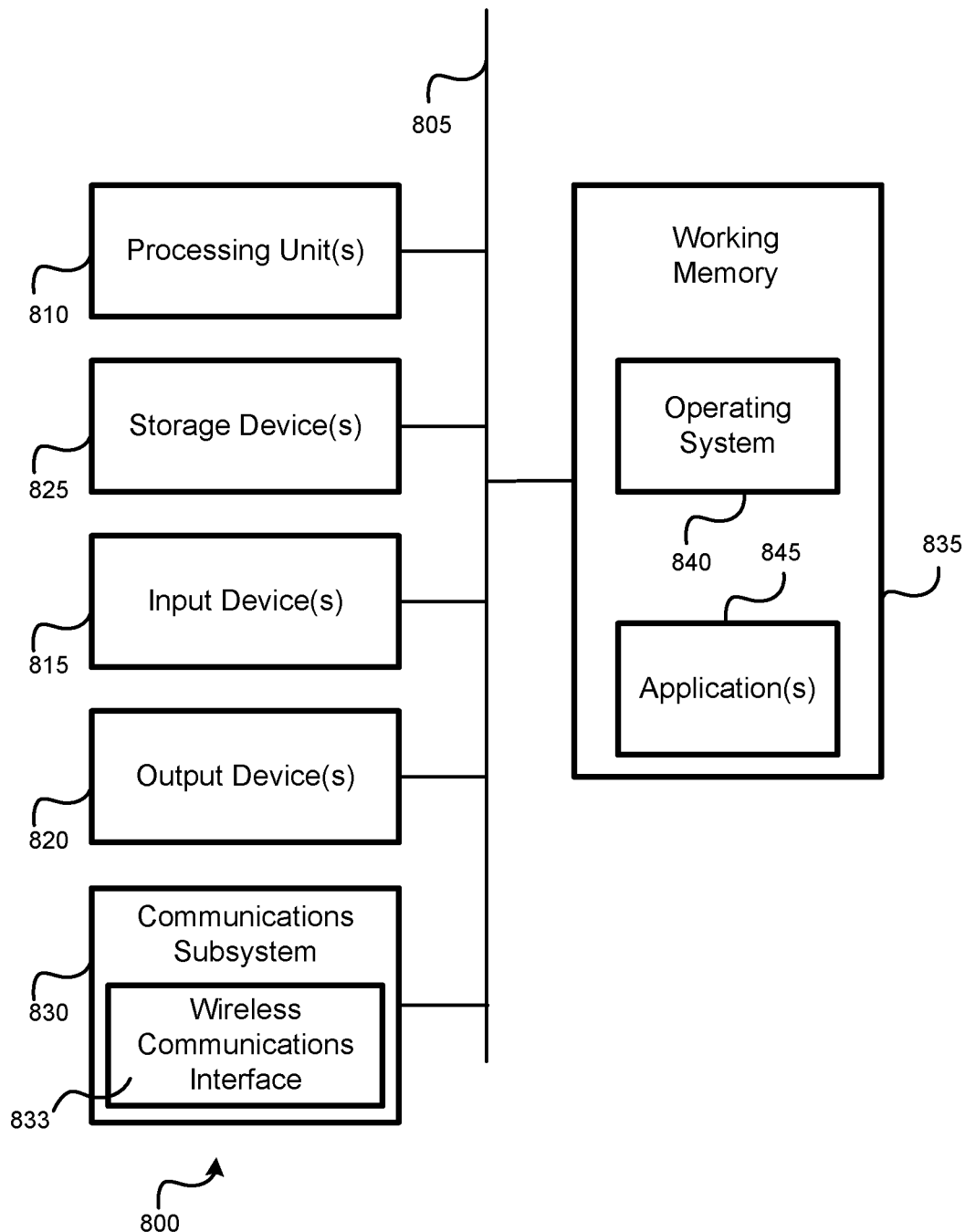
FIG. 8 illustrates an embodiment of a mobile computing system, which may be used to perform some or all of the functionality described in the embodiments herein.

FIG. 4 is a flow diagram illustrating a method 400 of robust accelerometer initialization, according to an embodiment. More specifically, the method of 400 allows for the determination of and compensation for the gravitational acceleration and velocity (if any) on the accelerometer. As with other figures provided herein, FIG. 4 is provided as a non-limiting example. Alternative embodiments may perform functions in alternative order, combine, separate, and/or rearrange the functions illustrated in the blocks of FIG. 4, and/or perform functions in parallel, depending on desired functionality. A person of ordinary skill in the art will appreciate such variations. The functions of one or more blocks illustrated in FIG. 4 may be performed by a processing unit communicatively coupled with a CAN, gyroscope, and accelerometer. Such a processing unit may be part of an on-vehicle position system (e.g., part of a VIO engine 240 and/or position determination unit 245 of on-vehicle position system 210, as illustrated in FIG. 2) and/or mobile computing system (e.g., mobile computing system 800, as illustrated in FIG. 8).

At block 410, CAN, gyroscope, and accelerometer data are collected. To enable the determination of acceleration from velocity data, multiple velocity measurements may be captured over a period of time. This time window may vary, depending on desired functionality. In some embodiments, this window of time is long enough to ensure multiple measurements are captured, while short enough to assume angular velocity is roughly constant. In some embodiments, gyroscope and accelerometer measurements may be captured at approximately 200 Hz, and rear wheel speed measurements from the CAN may be captured at approximately 100 Hz, although alternative embodiments may capture data at different rates. In such embodiments, the period of time for data collection may be less than one second (e.g., 0.75, 0.5, 0.25 seconds, etc.).

At block 420, the CAN data is used to estimate the vehicle's linear velocity and acceleration with respect to the r frame. As noted above, the CAN data may comprise wheel speed data (or other data indicative of linear velocity), which can be used to determine the vehicle's linear velocity and acceleration. Depending on the period of time over which data is collected and the data sampling rate, multiple data samples may be used to make this determination. In instances where the wheel speed data is sampled at a rate of 100 Hz, for example, 50 wheel speed measurements may be obtained over a period of 0.5 seconds.

Estimation of the vehicle's linear velocity and acceleration may utilize the mathematical formulas that follow. However, it can be noted that, with respect to the embodiments herein and the following formulas, although coordinate frames are expressed in $\mathcal{R}^3$, the techniques herein may be applied using alternative coordinate systems.

As a matter of notation, for frames x, y, and z, $^zT_{xy} \in \mathcal{R}^3$ denotes the translation from x to y expressed in z coordinates. The shorthand $T_{xy} \triangleq {}^xT_{xy}$ is also used herein. Similarly, $R_{xy}$ is the rotation from x to y. Furthermore, V denotes (linear) velocity, $\omega$ denotes angular velocity, and a denotes (linear) acceleration, each of which is in $\mathcal{R}^3$. The following formula can be used to relate translations in different frames:

$$T_{xy} = T_{xz} + {}^xT_{zy} = T_{xz} + R_{xz}T_{zy} \quad (1)$$

Using this notation, then, the functionality of block 420 of FIG. 4 may include estimating linear velocity, $^rV_{sr}(t)$, and acceleration, $$\frac{d}{dt}{}^rV_{sr}(t),$$

from rear wheel speed measurements and/or another indicator of linear velocity. Because $^rV_{sr}(t)$ is always pointing forward or backward along the y axis in the r frame (see FIG. 3), only the second element of a vector describing velocity in 3 dimensions with respect to the r frame will be non-zero. Consequently, the same applies to $$\frac{d}{dt}{}^rV_{sr}(t).$$

Thus, the estimation of $^rV_{sr}(t)$ is of the form $$(0,\hat{V},0)^T \quad (2)$$

and the estimation of $$\frac{d}{dt}{}^rV_{sr}(t)$$

is of the form $$(0,\hat{\alpha},0)^T. \quad (3)$$

Let $V^{(k)}$, k=0, 2, 3, . . . , N−1 be N rear wheel speed samples with timestamps $t^{(k)}$, k=0, 2, 3, . . . , N−1. Each sample $V^{(k)}$ may be a measured speed of a rear wheel at time $t^{(k)}$. In some embodiments, each sample $V^{(k)}$ may be an average of the measured speeds of two rear wheels at time $t^{(k)}$. Where acceleration is assumed to be constant over the period of time in which measurements were made (at block 410), $\hat{\alpha}$ can be computed as the slope of the speed samples.

According to some embodiments, variables $\hat{V}$ and/or $\hat{\alpha}$ may be computed to account for outliers in the $V^{(k)}$ speed samples, to allow for a robust estimate of linear velocity and acceleration. Examples of such techniques are provided herein below.

Referring again to FIG. 4, the functionality at block 430 comprises estimating the vehicle's angular velocity with respect to the b frame using gyroscope data. Here, angular velocity, $^b\omega_{sb}$, may be assumed to be constant for the period of time during which gyroscope measurements were made (at block 410), in a manner similar to the values estimated at block 420.

In some embodiments, the gyroscope may share the same frame (the b frame) of the accelerometer. (This may occur, for example, in instances where the accelerometer and gyroscope are part of the same IMU, as illustrated in FIG. 2. If this does not occur, the measurements can be transformed to the accelerometer frame.) In such instances, let $y_{gyr}^{(k)}$, k=0, 2, 3, . . . , $N_g$–1 be $N_g$ gyroscope samples. Each sample $y_{gyr}^{(k)}$ may be a measure of angular velocity of the gyroscope at time $t^{(k)}$. Estimates of the angular velocity based on the samples may account for gyroscope imperfections (e.g., bias, scaling, and non-orthogonality). Moreover, similar to estimates of linear velocity and acceleration as described above, estimates of angular velocity may further account for outliers in the gyroscope samples. Again, examples of such techniques are provided herein below.

At block 440, accelerometer data is used to estimate total acceleration, or specific force, with respect to the b frame. (As used herein, the terms "total acceleration" and "specific force" are used interchangeably, and refer to the total of all acceleration components acting on the accelerometer. As noted below, the accelerometer's measurements of this value may include some error due to bias, scaling, etc.) Here, specific force, $^bf_{sb}$, may be assumed to be constant for the period of time during which accelerometer measurements were made (at block 410), in a manner similar to the values estimated at blocks 420 and 430.

The estimation of the specific force at block 440 may be similar to the estimation of the vehicle's angular velocity in block 430. Let $y_{acc}^{(k)}$, k=0, 2, 3, . . . , $N_a$–1 be $N_a$ gyroscope samples. Each sample $y_{acc}^{(k)}$ may be a measure of acceleration by the accelerometer at time $t^{(k)}$. Similar to estimates of the angular velocity, estimates of total acceleration can take into account imperfections of the accelerometer (e.g., bias, scaling, and non-orthogonality). Moreover, estimates of acceleration may further account for outliers in the accelerometer samples. Again, examples of such techniques are provided herein below.

At block 450, the vehicle's acceleration with respect to the b frame is computed using the vehicle's angular velocity, linear velocity, and acceleration, as estimated at block 420-440. Because linear velocity and acceleration calculated in block 420 is with respect to the r frame, the vehicle acceleration computed with respect to the b frame involves translating and rotating data from the r frame to the b frame. However, as noted above, the b frame and r frame are fixed with respect to each other. And thus, the translation $T_{rb}$ and rotation $R_{rb}$ are known or can be determined. As such, the vehicle's acceleration $^b\alpha_{sb}$, may be determined using the following equation:

$$^b\alpha_{sb} = R_{rb}^T\left(\frac{d}{dt}{^rV_{sr}} + [(R_{rb}^b\omega_{sb})\times]^rV_{sr} + [(R_{rb}^b\omega_{sb})\times][(R_{rb}^b\omega_{sb})\times]T_{rb}\right) \quad (4)$$

At block 460, gravitational acceleration in the b frame can then be computed using the estimated total acceleration and computed vehicle acceleration. Specific force estimated at block 440, may be described as vehicle acceleration minus gravitational acceleration. In other words, in the b frame, specific force, $^bf_{sb}$, may be defined as follows:

$$^bf_{sb} \triangleq {^b\alpha_{sb}} - {^b\gamma} \quad (5)$$

where $^b\gamma$ is the gravity in the b frame. Therefore, gravitational acceleration may be calculated as $$^b\gamma = {^b\alpha_{sb}} - {^bf_{sb}}. \quad (6)$$

At block 470, velocity in the b frame can be computed using the angular velocity and linear velocity, estimated at blocks 430 and 420, respectively. Because the estimated linear velocity, $^rV_{sr}$, is with respect to the r frame, it needs to be translated and rotated accordingly. Accordingly, velocity in the b frame, $^bV_{sb}$, may be computed as follows:

$$^bV_{sb} = R_{rb}^T({^rV_{sr}}[(R_{rb}^b\omega_{sb})\times]T_{rb}). \quad (7)$$

It can be noted that, because the computation of velocity in block 470 does not depend on the computation of gravity at block 460, the order in which gravity and velocity are computed may vary, depending on desired functionality. In some embodiments, velocity may be computed after gravity (as shown in FIG. 4). In other embodiments, velocity may be computed before or at the same time as gravity. A person of ordinary skill in the art will appreciate that the order of other functions illustrated in FIG. 4 may be similarly rearranged.

As previously mentioned, measurements from the accelerometer, gyroscope, and CAN may include outlier values that, if unaccounted for, may result in an inaccurate or less accurate estimate of angular velocity, linear velocity, and/or acceleration based on these measurements. With this in mind, embodiments may account for such values (that is, perform outlier compensation) in any of a variety of ways, depending on desired functionality.

For example, for the estimation of linear acceleration at block 420 of FIG. 4, the value of $\hat{\alpha}$ in Expression (3) above should be the slope of the speed samples. According to some embodiments, the value of $\hat{\alpha}$ may be computed by taking staggered differences of speed samples (e.g., for a sample set of 100 samples, the difference between samples 1 and 51, samples 2 and 52, sample 3 and 53, and so on), then taking the median of those differences. In other words, the value of $\hat{\alpha}$ may be computed as $$\hat{\alpha} \triangleq \text{median}\left\{\frac{V^{(i+n)} - V^{(i)}}{t^{(i+n)} - t^{(i)}},\ i = 0, 1, 2, \ldots, N-1\right\}. \quad (8)$$

By taking staggered differences and performing a median in this manner, the effect of outlier values is reduced. As such, this process may be considered a means of outlier compensation.

With regard to the estimation of linear velocity, it may not be desirable to estimate the value of V in Expression (2) above as $V^{(N-1)}$ because $V^{(N-1)}$ may be an outlier. The speed samples may be modeled as $$V^{(k)} \approx \hat{\alpha}t^{(k)} + c \quad (9)$$

where c is a constant. To find a robust value for $\hat{V}$, a robust estimation of c may be first obtained with, for example, the following equation:

$$\hat{c} \triangleq \text{median}\{V^{(k)} - \hat{\alpha}t^{(k)}, k=0,1,2,\ldots,N-1\} \quad (10)$$

From (9) and (10), we can then compute V as $$\hat{V} \triangleq \hat{\alpha}t^{(k)} + \hat{c}. \quad (11)$$

According to some embodiments, the estimation of the vehicle's angular velocity at block 430 also may use the median of obtained measurement samples. For measurement samples $y_{gyr}^{(k)}$, k=0, 2, 3, . . . , $N_g$−1 a median may be obtained by $$\hat{y}_{gyr} \triangleq \text{median}\{y_{gyr}^{(k)}, k=0,2,3, \ldots, N_g-1\}. \quad (12)$$

As previously noted, the value of $y_{gyr}^{(k)}$ may be affected by noise, bias, and/or other imperfections. A robust estimation of angular velocity, $^b\omega_{sb}$, may then be calculated by $$^b\hat{\omega}_{sb} \triangleq A_g^{-1}(\hat{y}_{gyr}-b_g) \quad (13)$$

where $A_g$ is a matrix containing the scale factors and non-orthogonalities and $b_g$ is a bias term, both assumed to be constant and known.

The robust estimation of the specific force at block 440 of FIG. 4 may be similarly based on a median, according to some embodiments. For example, a robust estimation of $^bf_{sb}$ may be determined by may be obtained by $$^b\hat{f}_{sb} \triangleq A_a^{-1}(\text{median}\{y_{acc}^{(k)}, k=0,2,3, \ldots, N_a-1\}-b_a) \quad (14)$$

where $A_a$ is a matrix containing the scale factors and non-orthogonalities and $b_a$ is a bias term, both assumed to be constant and known. Here again, the value of $y_{acc}^{(k)}$ may be affected by noise, bias, and/or other imperfections.

Figure 5A:
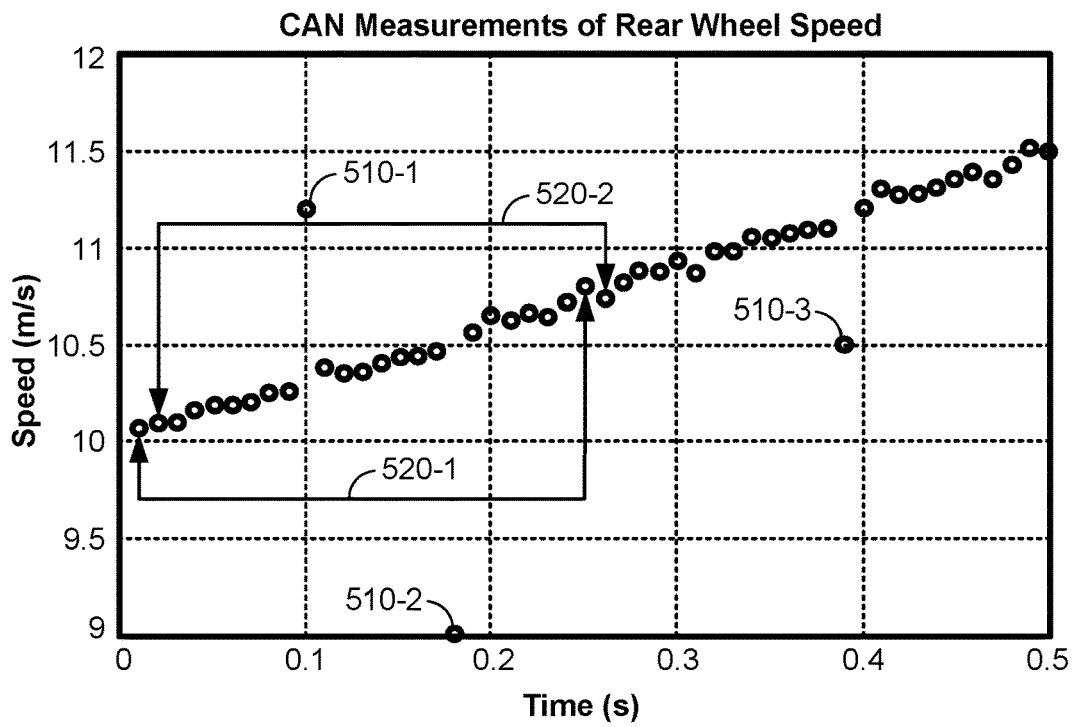
FIGS. 5A-5C are graphs used to illustrate an example of how robust estimates of the linear velocity and linear acceleration can be made from the rear wheel speed.
Figure 5B:
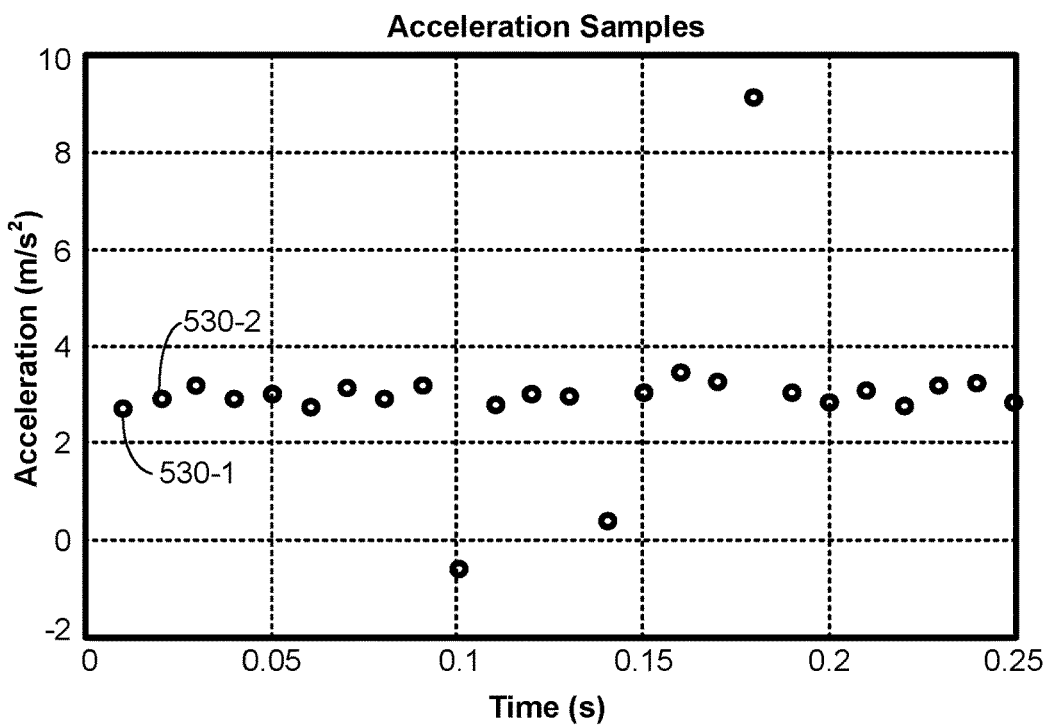
Figure 5C:
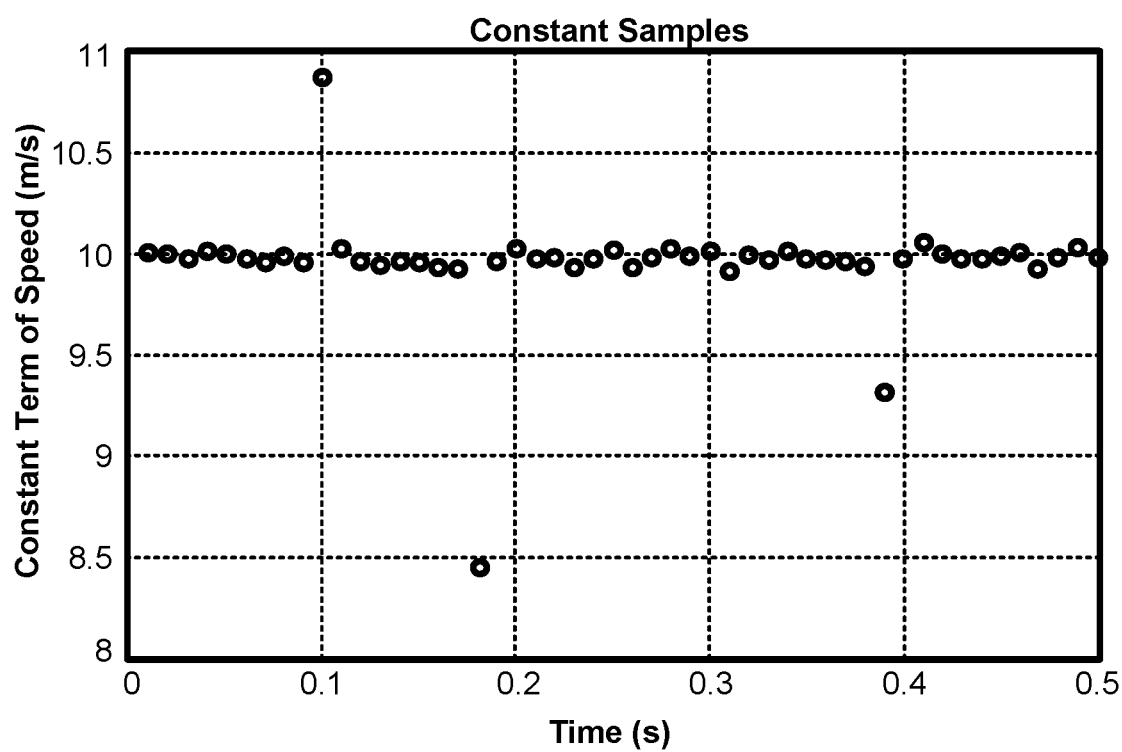

FIGS. 5A-5C are graphs used to illustrate an example of how robust estimates of the linear velocity and linear acceleration can be made from the rear wheel speed. As noted elsewhere herein, embodiments are necessarily limited to rear wheel speed, and may use alternative data indicative of linear velocity, if available.

FIG. 5A is a graph illustrating CAN measurements of the rear wheel speed obtained over a period of 0.5 seconds. In this example, speed measurements occur at 100 Hz, thereby resulting in 50 samples (at t=0.01, 0.02, . . . , 0.5). Here, the acceleration, a, is 3 m/s², and rear wheel speed is 10+ta (m/s). As can be seen, measurements V(t) have outliers 510-1, 510-2, and 510-3 occur at time 0.1, 0.18, and 0.39, respectively. As indicated previously, the difference of offset values may be used to determine an acceleration from the CAN rear wheel speed measurements.

FIG. 5B is a graph illustrating acceleration values derived from the CAN measurements of FIG. 5A using Equation (8) above. That is, first pair of offset values 520-1 (FIG. 5A) is used to determine a first acceleration value 530-1 (FIG. 5B), a second pair of offset values 520-2 is used to determine a second acceleration value 530-2, and so forth. Although the embodiments herein use values offset by half the length of the period of time (here, values offset by 0.25 seconds) alternative embodiments may use pair of values differently for acceleration determination.

In accordance with Equation (8), the median of the acceleration samples of FIG. 5B is used to provide the robust estimate of the acceleration. This can take care of outliers in the acceleration samples of FIG. 5B (which are result of outliers 510 in the underlying measurement samples of FIG. 5A). In this case, the median is determined to be 2.9718 m/s², which, despite the outliers, is very close to the true value of 3 m/s².

FIG. 5C is a graph illustrating how illustrates constant samples are obtained from the data in FIGS. 5A and 5B. Using the relationship between the constant, velocity, and acceleration for any given time (as provided in Expression (9) above), and assuming constant acceleration, the constant term of speed can be calculated for measurement sample of FIG. 5A. Here, the constant acceleration has been calculated as 2.9718 m/s², and thus each constant term of speed can be calculated as V(t)−2.9718t. According to Equation (10) above, the median is 10.004 m/s, which is very close to the true value of 10 m/s. Using Equation (11) above, the velocity at t=0.5, is calculated as 2.9718*0.5+10.004=11.49 m/s.

Figure 6A:
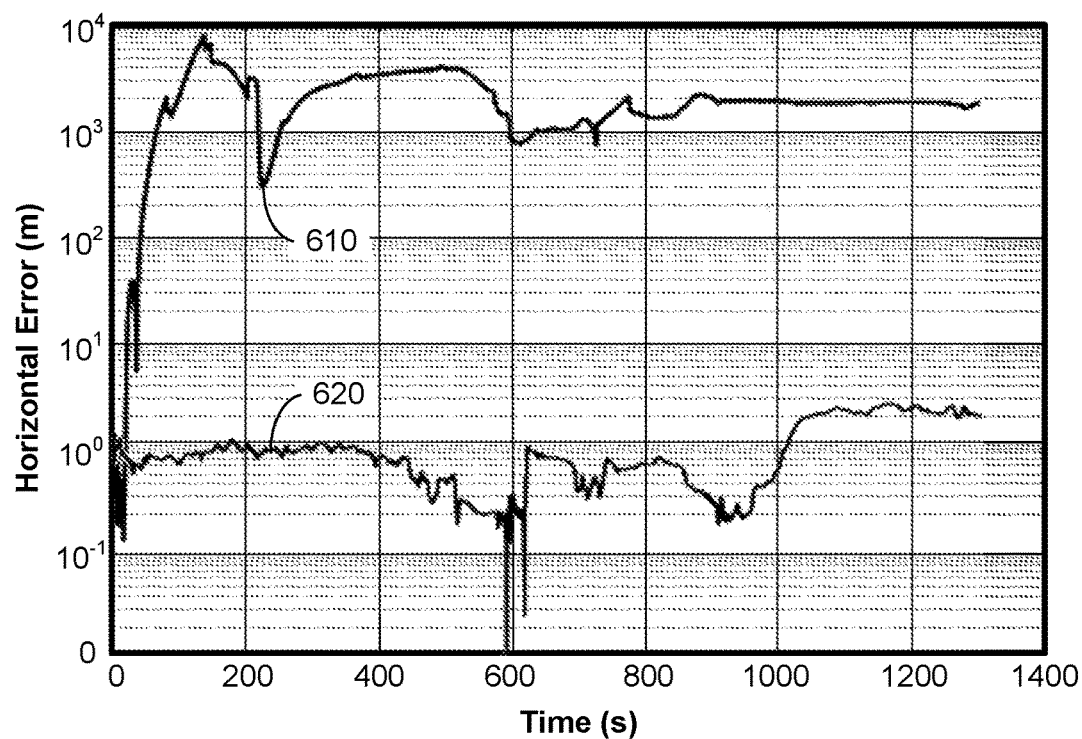
FIGS. 6A and 6B are charts comparing performance results of a case in which a VIO system uses the initialization techniques herein with a case in which the techniques are not used.
Figure 6B:
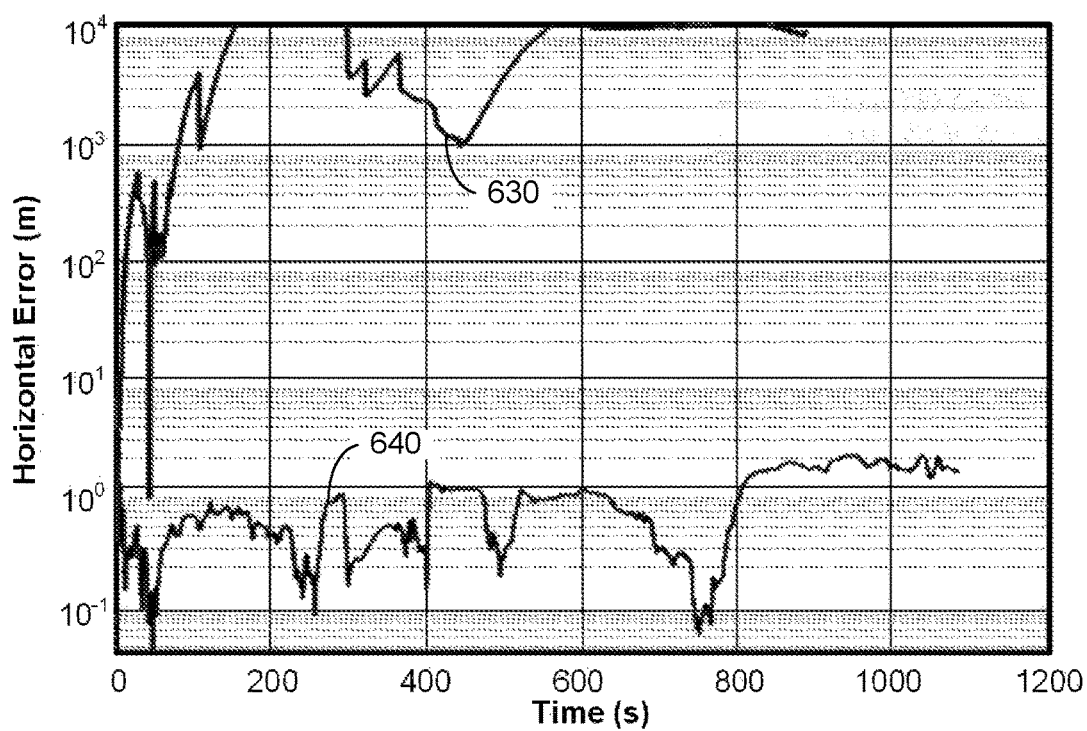

FIGS. 6A and 6B are charts comparing performance results of a case in which a VIO system uses the initialization techniques herein with a case in which the techniques are not used. All the results here are based on measurement data collected in real test drives. They axes of the charts represent horizontal error (distance from true position in a horizontal plane), in meters; the x axes of the charts represent duration of the test drive, in seconds.

FIG. 6A is a chart plotting positioning error when the VIO system is initialized when the vehicle is traveling at a velocity of 10 m/s and experiencing an acceleration of approximately 3 m/s². Plot 610 illustrates the error when the techniques herein are not used (i.e., the system initializes as if the vehicle is stationary). As can be seen, the positioning error quickly diverges, ultimately plateauing at over a kilometer of horizontal error. Such divergence makes the VIO system unusable after a matter of seconds.

On the other hand, plot 620 illustrates the error when the techniques herein are used. As can be seen, the VIO system remains highly accurate, remaining at or within a meter of accuracy for a majority of the time.

FIG. 6B is a chart plotting positioning error for a different test drive than that of FIG. 6A. Here, the VIO system is initialized when the vehicle is traveling at a velocity of 26 m/s and experiencing an acceleration of approximately 0.8 m/s². (That is, the test drive of FIG. 6B has higher velocity and lower acceleration during VIO initialization than the test drive of FIG. 6A.) Here, plot 630 illustrates the error when the initialization techniques herein are not used, and plot 640 illustrates the error when the techniques are used. As can be seen, plot 630 diverges even more quickly and results in even larger error than plot 610 of FIG. 6A. On the other hand, plot 640 (similar to plot 620) illustrates how the VIO system remains highly accurate, with accuracy of less than one meter for a majority of the drive.

Figure 7:
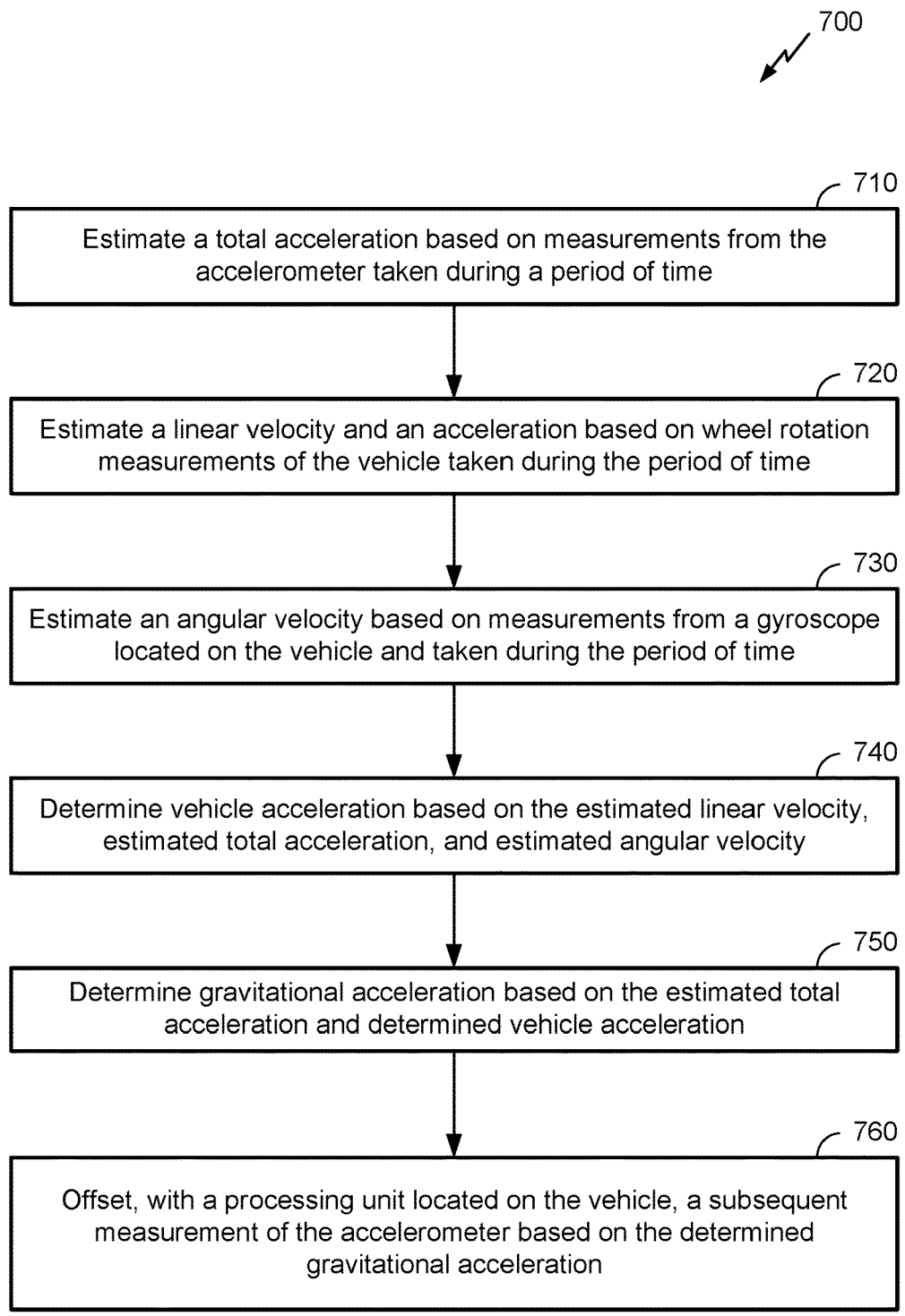
FIG. 7 is a flow diagram of a method of initializing an accelerometer located on a vehicle, according to an embodiment.

FIG. 7 is a flow diagram of a method 700 of initializing an accelerometer located on a vehicle, according to an embodiment. Here, as with FIG. 4, the method allows for the determination of the effects of gravity and velocity on an accelerometer. In some ways, the method 700 of FIG. 7 may be considered a more generalized version of the method 400 of FIG. 4. Alternative embodiments may perform functions in alternative order, combine, separate, and/or rearrange the functions illustrated in the blocks of FIG. 7, and/or perform functions in parallel, depending on desired functionality. A person of ordinary skill in the art will appreciate such variations. Means for performing the functionality of one or more blocks illustrated in FIG. 7 include a processing unit and/or other hardware and/or software components of a mobile computer system, such as the mobile computing system 800 of FIG. 8, described in further detail below. Additionally or alternatively, such means may include specialized hardware as described in relation to FIG. 2.

At block 710, a total acceleration or specific force is estimated based on measurements from the accelerometer taken during a period of time. As noted in the embodiments described above, imperfections in the accelerometer data, such as non-orthogonality, bias, and scaling may be accounted for to help ensure accuracy in the acceleration estimation. As further noted above, the period of time may vary, depending on sensor sampling rates and/or other factors. Means for performing the functionality of block 710 may include a bus 805, processing unit(s) 810, input device(s) 815, and/or other components of a mobile computing system 800 as illustrated in FIG. 8 and described in further detail below.

At block 720, the functionality includes estimating a linear velocity and an acceleration based on wheel rotation measurements of the vehicle taken during the period of time. As indicated in the embodiments above, wheel rotation measurements may be received from the CAN bus and may include, for example, wheel speed measurements and/or wheel tick information. The wheel rotation measurements themselves, or velocity (or other data) derived therefrom, then may be provided to a processing unit (or other hardware and/or software component) performing the functionality of block 720, according to some embodiments. This can be performed, for example, using the particular mathematical formulas provided herein. More generally, this functionality may be performed by determining displacement over time (which may include determining a circumference of one or more wheels for which the wheel rotation measurements are made) to determine velocity, and determining a slope of the displacement (e.g., taking a derivative) to determine exhilaration. As previously noted, estimating the linear velocity and acceleration may further comprise translating the wheel rotation measurements from a first coordinate frame to a second coordinate frame. Means for performing the functionality of block 720 may include a bus 805, processing unit(s) 810, input device(s) 815, and/or other components of a mobile computing system 800 as illustrated in FIG. 8 and described in further detail below.

At block 730, an angular velocity is estimated, based on measurements from a gyroscope located on the vehicle and taken during the period of time. Similar to the estimate of total acceleration based on the measurements from the accelerometer, the estimate of angular velocity based on measurements from the gyroscope may also take into account imperfections of the gyroscope, such as non-orthogonality, bias, and scale, to help ensure accuracy of the estimate. In some embodiments, the gyroscope and accelerometer may compose at least a portion of an IMU. In such embodiments, the IMU may compose a portion of a VIO system. Means for performing the functionality of block 730 may include a bus 805, processing unit(s) 810, input device(s) 815, and/or other components of a mobile computing system 800 as illustrated in FIG. 8 and described in further detail below.

At block 740, vehicle acceleration is determined based on the estimated linear velocity, estimated total acceleration, and estimated angular velocity. As noted above, because linear velocity and acceleration may be determined in a different coordinate frame (e.g., a coordinate frame centered on the rear axle of the vehicle) than the coordinate frame for which angular velocity is determined (e.g., the coordinate frame of the gyroscope or IMU comprising the gyroscope), one or more of the estimated linear velocity, estimated acceleration, and/or estimated angular velocity may be translated and rotated to ensure a common coordinate frame. Means for performing the functionality of block 740 may include a bus 805, processing unit(s) 810, and/or other components of a mobile computing system 800 as illustrated in FIG. 8 and described in further detail below.

At block 750, gravitational acceleration is determined, based on the estimated total acceleration and the determined vehicle acceleration. Put simply, the gravitational acceleration may comprise the acceleration measured by the accelerometer due to gravity, and may be determined by subtracting the determined vehicle acceleration from the estimated total acceleration. Means for performing the functionality of block 750 may include a bus 805, processing unit(s) 810, and/or other components of a mobile computing system 800 as illustrated in FIG. 8 and described in further detail below.

At block 760, a processing unit located on the vehicle offsets a subsequent measurement of the accelerometer based on the determined gravitational acceleration measurement. Here, the processing unit may comprise one or more processing units also used in any of the functions performed at block 710-750. In some embodiments, the offset subsequent measurement may be used in an/or provided to a position determination system, for determination of the location of the vehicle. As noted in previous embodiments, such a system may utilize additional sources of information, such as a GNSS receiver. In some embodiments, the method 700 may further comprise estimating, with the processing unit, a location of the vehicle based at least in part on the offset subsequent measurement of the accelerometer. Means for performing the functionality of block 760 may include a bus 805, processing unit(s) 810, and/or other components of a mobile computing system 800 as illustrated in FIG. 8 and described in further detail below.

As previously indicated, a vehicle velocity optionally may be determined using the estimated angular velocity and estimated linear velocity. While the techniques for determining gravitational acceleration provided herein enable initialization of the accelerometer will the vehicle is in motion, determining a vehicle velocity can enable proper initialization of a navigation filter while the vehicle is in motion. As described above, a navigation filter may enable accurate position determination by tracking estimates of several quantities, including vehicle pose and (linear) velocity. As such, in embodiments in which a navigation filter is utilized, the vehicle velocity may be determined.

The determination of the vehicle velocity may require translation in rotation of the estimated angular velocity and/or estimated linear velocity to a common reference frame. In some embodiments, such a translation and rotation may have been made at block 740 during the determination of vehicle acceleration.

As indicated in the embodiments described above, out outlier values in the wheel rotation measurements, measurements from the accelerometer, and/or measurements from the gyroscope, and/or data derived therefrom, may be compensated for in any of a variety of ways. For example, outlier compensation may be performed on wheel rotation measurements, as described in relation to FIGS. 5A and 5B, by determining values of staggered differences of the wheel rotation measurements. In some embodiments, outlier compensation may further comprise taking a median of the determined values of staggered differences. As noted above, using staggered differences (and optionally the median thereof) in this manner is a means of outlier compensation due to the fact that this technique reduces the effects of outliers. As described in relation to FIG. 5C, determining the vehicle velocity may comprise determining a constant for each wheel rotation measurement, based at least in part on the determined vehicle acceleration. Embodiments may additionally determine the vehicle velocity further based on a median of the constants for each wheel rotation measurement.

FIG. 8 illustrates an embodiment of an mobile computing system 800, which may be used to perform some or all of the functionality described in the embodiments herein, including the functionality of one or more of the blocks illustrated in FIGS. 4 and 7. The mobile computing system 800 may be located on a vehicle, and may incorporate or be incorporated into the on-vehicle position system 210 of FIG. 2. For example, the VIO engine 240 and/or position determination unit 245 of FIG. 2 may be executed by processing unit(s) 810, the IMU 230 may be included in the input device(s) 815, the GNSS unit 225, and so forth. A person of ordinary skill in the art will appreciate where additional or alternative components of FIG. 2 and FIG. 8 may overlap.

It should be noted that FIG. 8 is meant only to provide a generalized illustration of various components, any or all of which may be utilized as appropriate. FIG. 8, therefore, broadly illustrates how individual system elements may be implemented in a relatively separated or relatively more integrated manner. In addition, it can be noted that components illustrated by FIG. 8 can be localized to a single device and/or distributed among various networked devices, which may be disposed at different physical locations on a vehicle.

The mobile computing system 800 is shown comprising hardware elements that can be communicatively coupled via a bus 805 (or may otherwise be in communication, as appropriate). The hardware elements may include processing unit(s) 810, which can include without limitation one or more general-purpose processors, one or more special-purpose processors (such as a digital signal processor (DSP), graphical processing unit (GPU), application specific integrated circuit (ASIC), field-programmable gate array (FPGA), and/or the like), and/or other processing structure, which can be configured to perform one or more of the methods described herein, including at least a portion of the methods described in FIGS. 4 and 7. The mobile computing system 800 also can include one or more input devices 815, which can include without limitation a CAN bus (and/or another source of data for various vehicle systems), IMU (and/or one or more accelerometers, gyroscopes, etc.), camera, GNSS receiver, and/or the like; and one or more output devices 820, which can include without limitation a display device, one or more vehicle automation and/or control systems, and/or the like.

The mobile computing system 800 may further include (and/or be in communication with) one or more non-transitory storage devices 825, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The mobile computing system 800 may also include a communications subsystem 830, which can include support of communication technologies, including wireless communication technologies managed and controlled by a wireless communication interface 833. The communications subsystem 830 may include a modem, a network card (wireless or wired), an infrared communication device, a wireless communication device, and/or a chipset, and/or the like. The communications subsystem 830 may include one or more input and/or output communication interfaces, such as the wireless communication interface 833, to permit data to be exchanged with a wireless network, mobile devices, other computer systems, and/or other electronic devices. A wireless network may include a cellular network or other wireless wide area network (WWAN), a wireless local area network (WLAN), and/or the like.

In many embodiments, the mobile computing system 800 will further comprise a working memory 835, which can include a RAM and/or ROM device. Software elements, shown as being located within the working memory 835, can include an operating system 840, device drivers, executable libraries, and/or other code, such as application(s) 845, which may comprise computer programs provided by various embodiments, and/or may be designed to implement methods, and/or configure systems, provided by other embodiments, as described herein. Merely by way of example, one or more procedures described with respect to the method(s) discussed above, such as the methods described in relation to FIGS. 4 and 7, may be implemented (in whole or in part) as code and/or instructions that are stored (e.g. temporarily) in working memory 835 and are executable by a computer (and/or a processing unit within a computer such as processing unit(s) 810); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 825 described above. In some cases, the storage medium might be incorporated within a computer system, such as mobile computing system 800. In other embodiments, the storage medium might be separate from a computer system (e.g., a removable medium, such as an optical disc), and/or provided in an installation package, such that the storage medium can be used to program, configure, and/or adapt a general purpose computer with the instructions/code stored thereon. These instructions might take the form of executable code, which is executable by the mobile computing system 800 and/or might take the form of source and/or installable code, which, upon compilation and/or installation on the mobile computing system 800 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media, volatile media, and transmission media. Common forms of computer-readable media include, for example, magnetic and/or optical media, any other physical medium with patterns of holes, a RAM, a PROM, EPROM, a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussions utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the spirit of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

What is claimed is:

1. A method of initializing an accelerometer located on a vehicle, the method comprising:
   estimating a total acceleration based on measurements from the accelerometer taken during a period of time when the vehicle is in motion;
   estimating a linear velocity and an acceleration based on wheel rotation measurements of the vehicle taken during the period of time;
   estimating an angular velocity based on measurements from a gyroscope located on the vehicle and taken during the period of time;
   determining vehicle acceleration during the period of time based on the estimated linear velocity, estimated total acceleration, and estimated angular velocity;
   determining gravitational acceleration based on the estimated total acceleration and determined vehicle acceleration during the period of time; and
   offsetting, with a processing unit located on the vehicle, a subsequent measurement of the accelerometer based on the determined gravitational acceleration.

2. The method of claim 1, further comprising:
   determining a vehicle velocity using the estimated angular velocity and estimated linear velocity; and
   using the determined vehicle velocity to initialize a navigation filter.

3. The method of claim 1, wherein estimating the linear velocity and estimating the total acceleration further comprises translating the wheel rotation measurements from a first coordinate frame to a second coordinate frame.

4. The method of claim 1, wherein the accelerometer and the gyroscope compose at least a portion of an inertial measurement unit (IMU) located on the vehicle.

5. The method of claim 4, wherein the IMU composes a portion of a visual inertial odometry (VIO) system located on the vehicle.

6. The method of claim 1, further comprising estimating, with the processing unit, a location of the vehicle based at least in part on the offset subsequent measurement of the accelerometer.

7. The method of claim 1, further comprising performing outlier compensation on the wheel rotation measurements, measurements from the gyroscope, or measurements from the accelerometer, or any combination thereof.

8. The method of claim 7, comprising performing outlier compensation on the wheel rotation measurements, wherein performing the outlier compensation comprises determining values of staggered differences of the wheel rotation measurements.

9. The method of claim 8, wherein determining the vehicle acceleration comprises taking a median of the determined values of staggered differences.

10. The method of claim 9, further comprising determining a vehicle velocity at least in part by using the estimated angular velocity and estimated linear velocity and determining a constant for each wheel rotation measurement, based at least in part on the determined vehicle acceleration.

11. The method of claim 10, wherein determining the vehicle velocity further is based on a median of the constants for the wheel rotation measurements.

12. A mobile computing system comprising:
    a memory; and
    a processing unit communicatively coupled with the memory and configured to:
       estimate a total acceleration based on measurements received from an accelerometer located on a vehicle and taken during a period of time when the vehicle is in motion;
       estimate a linear velocity and an acceleration based on wheel rotation measurements of the vehicle taken during the period of time;
       estimate an angular velocity based on measurements from a gyroscope located on the vehicle and taken during the period of time;

determine vehicle acceleration during the period of time based on the estimated linear velocity, estimated total acceleration, and estimated angular velocity;

determine gravitational acceleration based on the estimated total acceleration and determined vehicle acceleration during the period of time; and offset a subsequent measurement of the accelerometer based on the determined gravitational acceleration.

13. The mobile computing system of claim 12, wherein the processing unit is further configured to:

determine a vehicle velocity using the estimated angular velocity and estimated linear velocity; and use the determined vehicle velocity to initialize a navigation filter.

14. The mobile computing system of claim 12, wherein the processing unit is configured to estimate the linear velocity and configured to estimate the total acceleration at least in part by translating the wheel rotation measurements from a first coordinate frame to a second coordinate frame.

15. The mobile computing system of claim 12, further comprising an IMU comprising the accelerometer and the gyroscope.

16. The mobile computing system of claim 15 further comprising a visual inertial odometry (VIO) system, which comprises the IMU.

17. The mobile computing system of claim 12, wherein the processing unit is configured to estimate a location of the vehicle based at least in part on the offset subsequent measurement of the accelerometer.

18. The mobile computing system of claim 12, wherein the processing unit is configured to perform outlier compensation on the wheel rotation measurements, measurements from the gyroscope, or measurements from the accelerometer, or any combination thereof.

19. The mobile computing system of claim 18, wherein the processing unit is configured to perform the outlier compensation at least in part by determining values of staggered differences of the wheel rotation measurements.

20. The mobile computing system of claim 19, wherein the processing unit is configured to determine the vehicle acceleration at least in part by taking a median of the determined values of staggered differences.

21. The mobile computing system of claim 20, wherein the processing unit is further configured to determine a vehicle velocity at least in part by using the estimated angular velocity and estimated linear velocity and determining a constant for each wheel rotation measurement, based at least in part on the determined vehicle acceleration.

22. The mobile computing system of claim 21, wherein the processing unit is configured to determine the vehicle velocity further based on a median of the constants for the wheel rotation measurements.

23. A device comprising:

means for estimating a total acceleration based on acceleration measurements of a vehicle taken during a period of time when the vehicle is in motion;

means for estimating a linear velocity and an acceleration based on wheel rotation measurements of the vehicle taken during the period of time;

means for estimating an angular velocity based on measurements of rotational movement of the vehicle taken during the period of time;

means for determining vehicle acceleration during the period of time based on the estimated linear velocity, estimated total acceleration, and estimated angular velocity;

means for determining gravitational acceleration based on the estimated total acceleration and determined vehicle acceleration during the period of time; and means for offsetting a subsequent acceleration measurement based on the determined gravitational acceleration.

24. The device of claim 23, further comprising:

means for determining a vehicle velocity using the estimated angular velocity and estimated linear velocity; and means for using the determined vehicle velocity to initialize a navigation filter.

25. The device of claim 23, wherein the means for estimating the linear velocity and the means for estimating the total acceleration further comprise means for translating the wheel rotation measurements from a first coordinate frame to a second coordinate frame.

26. The device of claim 23, further comprising means for obtaining the acceleration measurements of the vehicle and measurements of rotational movement of the vehicle from an inertial measurement unit (IMU) located on the vehicle.

27. The device of claim 26, wherein the IMU composes a portion of a visual inertial odometry (VIO) means located on the vehicle.

28. The device of claim 23, further comprising means for estimating a location of the vehicle based at least in part on the offset subsequent acceleration measurement.

29. The device of claim 23, further comprising means for performing outlier compensation on the wheel rotation measurements, measurements of rotational movement of the vehicle, or acceleration measurements of the vehicle, or any combination thereof.

30. The device of claim 29, wherein the means for performing outlier compensation on the wheel rotation measurements include means for determining values of staggered differences of the wheel rotation measurements.

31. The device of claim 30, wherein the means for determining the vehicle acceleration comprises means for taking a median of the determined values of staggered differences.

32. The device of claim 31, further comprising means for determining a vehicle velocity at least in part by using the estimated angular velocity and estimated linear velocity and means for determining a constant for each wheel rotation measurement, based at least in part on the determined vehicle acceleration.

33. The device of claim 32, wherein the means for determining the vehicle velocity further is configured to base the determining on a median of the constants for the wheel rotation measurements.

34. A non-transitory computer-readable medium having instructions embedded thereon for initializing an accelerometer located on a vehicle, wherein the instructions, when executed by one or more processing units, cause the one or more processing units to:

estimate a total acceleration based on measurements from the accelerometer taken during a period of time when the vehicle is in motion;

estimate a linear velocity and an acceleration based on wheel rotation measurements of the vehicle taken during the period of time;

estimate an angular velocity based on measurements from a gyroscope located on the vehicle and taken during the period of time;

determine vehicle acceleration during the period of time based on the estimated linear velocity, estimated total acceleration, and estimated angular velocity;

determine gravitational acceleration based on the estimated total acceleration and determined vehicle acceleration during the period of time; and offset a subsequent measurement of the accelerometer based on the determined gravitational acceleration.

35. The non-transitory computer-readable medium of claim 34, further comprising instructions that, when executed by the one or more processing units, further cause the one or more processing units to:

determine a vehicle velocity using the estimated angular velocity and estimated linear velocity; and use the determined vehicle velocity to initialize a navigation filter.

36. The non-transitory computer-readable medium of claim 34, wherein the instructions for estimating the linear velocity and the instructions for estimating the total acceleration further comprise instructions that, when executed by the one or more processing units, further cause the one or more processing units to translate the wheel rotation measurements from a first coordinate frame to a second coordinate frame.

37. The non-transitory computer-readable medium of claim 34, further comprising instructions that, when executed by the one or more processing units, further cause the one or more processing units to obtain the measurements from the accelerometer and the measurements from the gyroscope from an inertial measurement unit (IMU) located on the vehicle.

38. The non-transitory computer-readable medium of claim 34, further comprising instructions that, when executed by the one or more processing units, further cause the one or more processing units to estimate, a location of the vehicle based at least in part on the offset subsequent measurement of the accelerometer.

39. The non-transitory computer-readable medium of claim 34, further comprising instructions that, when executed by the one or more processing units, further cause the one or more processing units to perform outlier compensation on the wheel rotation measurements, measurements from the gyroscope, or measurements from the accelerometer, or any combination thereof.

40. The non-transitory computer-readable medium of claim 39, wherein the instructions for performing outlier compensation on the wheel rotation measurements comprise instructions for determining values of staggered differences of the wheel rotation measurements.

41. The non-transitory computer-readable medium of claim 40, wherein the instructions for determining the vehicle acceleration comprise instructions for taking a median of the determined values of staggered differences.

42. The non-transitory computer-readable medium of claim 41, further comprising instructions that, when executed by the one or more processing units, further cause the one or more processing units to determine a vehicle velocity at least in part by using the estimated angular velocity and estimated linear velocity and determine a constant for each wheel rotation measurement, based at least in part on the determined vehicle acceleration.

43. The non-transitory computer-readable medium of claim 42, wherein the instructions for determining the vehicle velocity further include instructions for basing the determining on a median of the constants for the wheel rotation measurements.

* * * * *